US010276056B2

(12) United States Patent
Rasmussen et al.

(10) Patent No.: US 10,276,056 B2
(45) Date of Patent: Apr. 30, 2019

(54) VEHICLE SAFETY SYSTEM MOBILE TARGET

(71) Applicant: GM Global Technology Operations LLC, Detroit, MI (US)

(72) Inventors: Michael J. Rasmussen, Warren, MI (US); Thomas R. Brown, Shelby Township, MI (US); Daniel Rudd, St. Clair Shores, MI (US); Stephen W. Decker, Clarkston, MI (US); Timothy J. Romelhardt, Bruce Township, MI (US); Arnold Michael Kirsch, Eastpointe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 15/478,565

(22) Filed: Apr. 4, 2017

(65) Prior Publication Data

US 2018/0286280 A1 Oct. 4, 2018

(51) Int. Cl.
| | | |
|---|---|---|
| G09B 9/00 | (2006.01) | |
| G01M 17/00 | (2006.01) | |
| G08G 1/16 | (2006.01) | |
| G01M 17/007 | (2006.01) | |

(52) U.S. Cl.
CPC .......... *G09B 9/006* (2013.01); *G01M 17/00* (2013.01); *G01M 17/0078* (2013.01); *G08G 1/166* (2013.01)

(58) Field of Classification Search
CPC ................................ B60P 3/122; A63B 69/16
See application file for complete search history.

(56) References Cited

U.S. PATENT DOCUMENTS

| | | | | |
|---|---|---|---|---|
| 6,095,746 A * | 8/2000 | Bergin | .................. | B62B 5/0083 269/17 |
| 6,805,657 B2 * | 10/2004 | Trenary | ............. | A63C 17/0026 280/87.01 |
| 7,156,403 B2 * | 1/2007 | Abbott | .................... | B60P 3/122 280/79.11 |
| 7,195,487 B2 * | 3/2007 | Robbins | ................. | G05B 17/02 434/61 |
| 7,226,395 B2 * | 6/2007 | Wu | ........................ | A63B 69/16 280/293 |
| 7,303,510 B2 * | 12/2007 | Gebhardt | ............... | A63B 69/16 482/5 |
| 8,052,159 B2 * | 11/2011 | Chen | ....................... | B62H 1/02 280/79.11 |
| 2002/0119035 A1 * | 8/2002 | Hamilton | ............... | B60P 3/125 414/426 |

(Continued)

*Primary Examiner* — Kevin Hurley
(74) *Attorney, Agent, or Firm* — Cantor Colburn LLP (57) ABSTRACT

A vehicle safety system target includes a first platform disposed on a mobile chassis, a frame assembly, a first securing member, a second platform, and a mounting member. The frame assembly is at least partially disposed about the mobile chassis and includes a first frame member and a second frame member. The first frame member is disposed on the first platform. The second frame member is disposed on the first platform. The first securing member is configured to couple an object to the first platform. The second platform is spaced apart from the first platform. The mounting member is disposed on the second platform.

18 Claims, 6 Drawing Sheets

(56) References Cited

U.S. PATENT DOCUMENTS

2009/0267319 A1* 10/2009 Armstrong ................ B62B 3/12
                                                                280/402
2016/0236036 A1*  8/2016 Kalogiros .............. A63B 69/16
2017/0368409 A1* 12/2017 Felker ...................... B62M 1/26
2018/0086360 A1*  3/2018 Pierce ................... B62B 13/046

* cited by examiner

VEHICLE SAFETY SYSTEM MOBILE TARGET

INTRODUCTION

Vehicle safety systems are incorporated into a vehicle to reduce the likelihood of, or prepare the vehicle for, an impact event. A vehicle safety system is able to perform such operations by being provided with accurate object classifications or target classifications. The vehicle safety systems may be evaluated during vehicle safety system testing and validation by use of various targets.

Accordingly, it is desirable to provide a vehicle safety system target to aid in the improvement and development of vehicle safety systems.

SUMMARY

In one exemplary embodiment, a vehicle safety system target is provided. The vehicle safety system target includes a first platform disposed on a mobile chassis, a frame assembly, a first securing member, a second platform, a mounting member, and a second securing member. The frame assembly is at least partially disposed about the mobile chassis and includes a first frame member and a second frame member. The first frame member is disposed on the first platform. The second frame member is spaced apart from the first frame member and is disposed on the first platform. The first securing member is configured to couple an object to the first platform. The second platform is spaced apart from the first platform. The mounting member is disposed on the second platform. The second securing member is configured to couple the object to the mounting member and the second platform.

In addition to one or more of the features described herein, the object resembles a human riding a bicycle.

In addition to one or more of the features described herein, the frame assembly further includes a first side member and a second side member. The first side member is spaced apart from and is disposed generally parallel to the first frame member. The second side member is spaced apart from and is disposed generally parallel to the second frame member.

In addition to one or more of the features described herein, the frame assembly further includes a first cross member that extends between the first side member and the second side member. The first cross member is spaced apart from and is disposed generally parallel to a first end of the first platform.

In addition to one or more of the features described herein, the first cross member and the first side member at least partially define a first corner.

In addition to one or more of the features described herein, a first curb guide is operatively connected to the first corner.

In another exemplary embodiment, a vehicle safety system target is provided. The vehicle safety system target includes a mobile chassis, a first platform, and a frame assembly. The mobile chassis is configured to maneuver as a human riding a bicycle. The first platform is disposed on the mobile chassis and has a first side and a second side each extending between a first end and a second end. The frame assembly includes a first frame member disposed on the first platform and extending along the first side, a second frame member disposed on the first platform and extending along the second side, a first side member spaced apart from and disposed generally parallel to the first frame member, and a second side member spaced apart from and disposed generally parallel to the second frame member.

In addition to one or more of the features described herein, the assembly further includes a first cross member and a second cross member. The first cross member is spaced apart from and is disposed generally parallel to the first end. The first cross member extends between the first side member, the first frame member, the second frame member, and the second side member. The second cross member is spaced apart from and is disposed generally parallel to the second end. The second cross member extends between the first side member, the first frame member, the second frame member, and the second side member.

In addition to one or more of the features described herein, a panel assembly is disposed on the first platform and is disposed about the frame assembly.

In addition to one or more of the features described herein, a first curb guide is operatively connected to the first cross member and the first side member.

In addition to one or more of the features described herein, a second curb guide operatively connected to the first cross member and the second side member.

In addition to one or more of the features described herein, a first side panel operatively connected to the first side member and extending between the first cross member and the second cross member.

In addition to one or more of the features described herein, the first side panel operatively connects the panel assembly to the frame assembly.

In addition to one or more of the features described herein, the first side panel is spaced apart from first curb guide.

In addition to one or more of the features described herein, a second side panel is operatively connected to the second side member and extends between the first cross member and the second cross member.

In addition to one or more of the features described herein, the second side panel operatively connects the panel assembly to the frame assembly.

In addition to one or more of the features described herein, a second platform is spaced apart from the first platform and a mounting member is disposed on the second platform.

In addition to one or more of the features described herein, the second platform is disposed substantially parallel to the first platform.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Vehicles may be provided with a vehicle safety system that monitors an environment external to the vehicle. The vehicle safety system may be configured to identify or classify an object within the environment external to the vehicle and may perform various functions, operations, or maneuvers based on the identity or classification of the object within the environment external to the vehicle.

Figure 1:
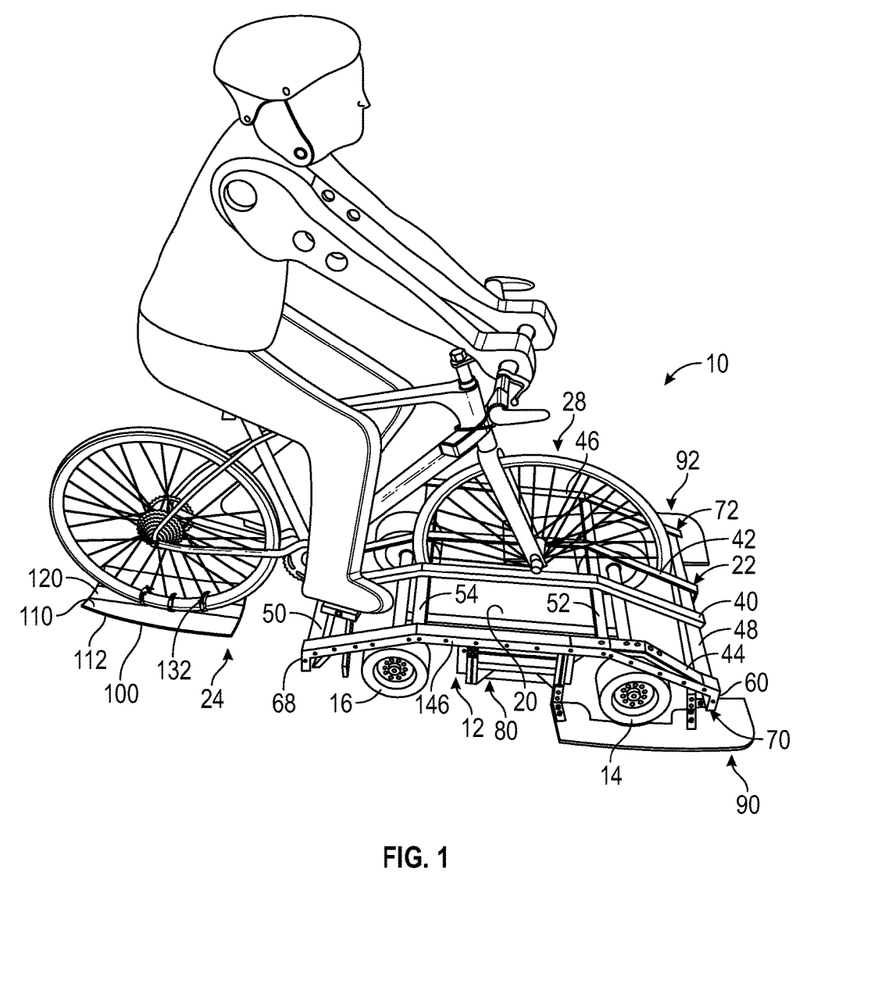
FIG. 1 is a view of a vehicle safety system target.

The vehicle safety system may be tested and evaluated to assess the vehicle safety system's performance. Various objects may be positioned and/or moved relative to the vehicle during such testing and evaluation. These various objects may be representative of a pedestrian, another vehicle, a bicycle, a bicycle having a rider, a pet, and various other types of objects that the vehicle may encounter during operation. Referring to FIG. 1, a vehicle safety system target 10 is shown. The vehicle safety system target 10 may be a mobile target that is usable during vehicle safety system testing and/or evaluation. The vehicle safety system target 10 looks to each type of sensor being tested as a real human riding a bike, as such, the radar, lidar, and/or camera signature of the vehicle safety system target 10 has a high fidelity. The vehicle safety system target 10 may be able to perform various repeatable maneuvers to enable vehicle safety system and sensor testing and the iteration of algorithms by performing real-life maneuvers.

The vehicle safety system target 10 may be operatively connected to a mobile chassis 12. The mobile chassis 12 may be a remotely controlled vehicle having a steering system and a propulsion system. The steering system may include at least one steerable wheel 14 and the propulsion system may include at least one drive wheel 16 drivingly connected to a drive motor. The mobile chassis 12 enables the vehicle safety system target 10 to maneuver like a human riding a bike.

The at least one steerable wheel 14 maybe disposed proximate a first quadrant or a first corner of the mobile chassis 12 and another steerable wheel maybe disposed proximate a second quadrant or a second corner of the mobile chassis 12. The at least one steerable wheel 14 is movable or pivotable to maneuver the mobile chassis 12 and the vehicle safety system target 10 in response to remotely provided inputs.

The at least one drive wheel 16 may be spaced apart from the at least one steerable wheel 14 such that the at least one steerable wheel 14 and the at least one drive wheel 16 are disposed on opposite ends or sides of the mobile chassis 12. The at least one drive wheel 16 is drivable or rotatable to propel the mobile chassis 12 and the vehicle safety system target 10 in response to remotely provided inputs.

Referring to FIGS. 1-10, the vehicle safety system target 10 may include a first platform 20, a frame assembly 22, a second platform 24, and a panel assembly 26.

The first platform 20 maybe disposed on and operatively connected to the mobile chassis 12. The first platform 20 is configured to receive a portion of an object 28 such that the object 28 is maneuverable as the vehicle safety system target 10 and the mobile chassis 12 are maneuvered. The object 28 may be a bicycle, a bicycle having a humanoid shaped rider, a pedestrian or other object that may be present within an operating environment of a vehicle having a vehicle safety system.

Figure 3:
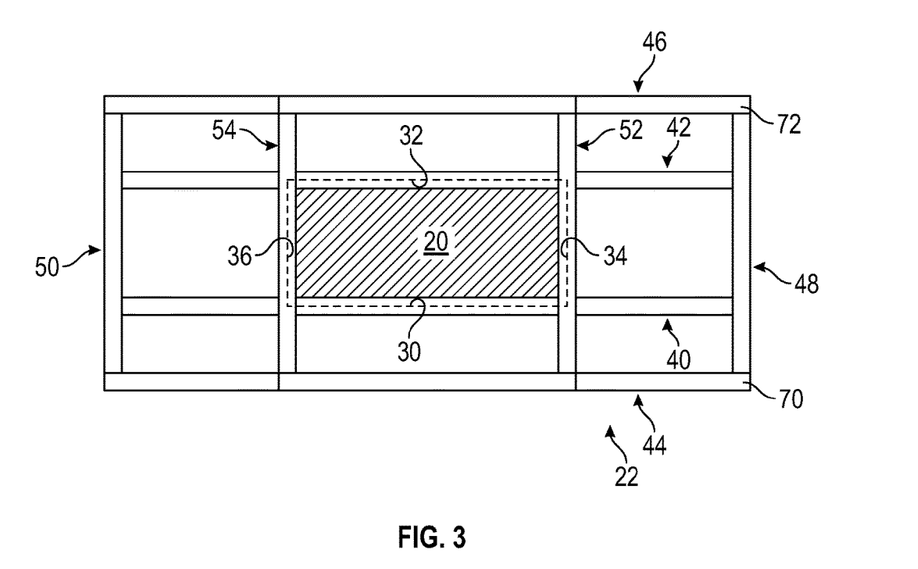
FIG. 3 is a plan view of the frame assembly of the vehicle safety system target.
Figure 4:
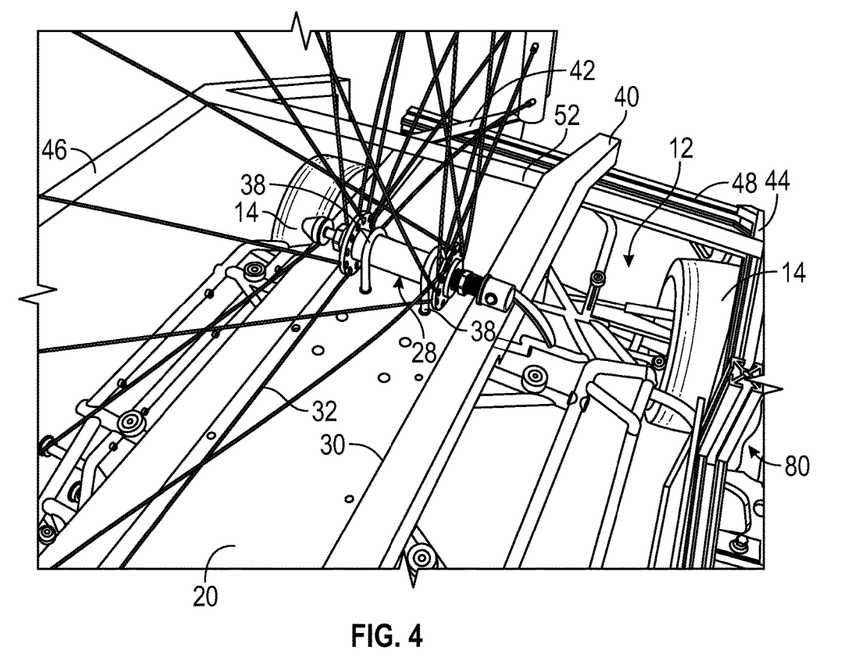
FIG. 4. is a partial perspective view showing a first platform of the vehicle safety system target.
Figure 5:
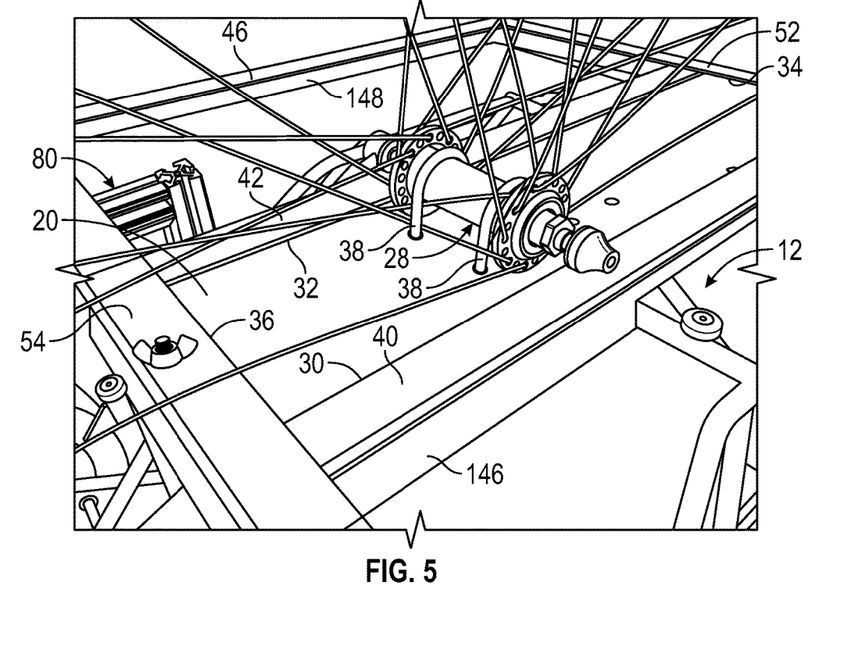
FIG. 5 is another partial perspective view showing the first platform of the vehicle safety system target.

Referring to FIGS. 3-5, the first platform 20 may include a first side 30, a second side 32, a first end 34, and a second end 36. The first side 30 is disposed substantially parallel to the second side 32. The second side 32 is disposed opposite the first side 30. The first end 34 extends between the first side 30 and the second side 32. The first end 34 is disposed proximate the at least one steerable wheel 14 of the mobile chassis 12. The second end 36 is disposed opposite the first end 34. The second end 36 may be disposed proximate the at least one drive wheel 16.

Referring to FIGS. 4 and 5, a first securing member 38 may be configured to operatively secure, couple, or connect a portion of the object 28 to the first platform 20. The first securing member 38 extends about a portion of the object 28 and extends into or through the first platform 20.

The frame assembly 22 may be disposed on and operatively connected to the first platform 20. The frame assembly 22 may be disposed on or disposed about the mobile chassis 12.

Referring to FIGS. 1-6, the frame assembly 22 may include a first frame member 40, a second frame member 42, a first side member 44, a second side member 46, a first cross member 48, a second cross member 50, a third cross member 52, and a fourth cross member 54.

The first frame member 40 may be disposed on the first platform 20. In at least one embodiment, the first frame member 40 may support the first platform 20. The first frame member 40 may extend along the first side 30 of the first platform 20. The first frame member 40 may be disposed generally parallel to the first side 30 of the first platform 20.

The second frame member 42 may be disposed on the first platform 20. In at least one embodiment, the second frame member 42 may also support the first platform 20. The second frame member 42 may extend along the second side 32 of the first platform 20. The second frame member 42 may be disposed generally parallel to the second side 32 of the first platform 20.

The first side member 44 may be spaced apart from and may be disposed generally parallel to the first frame member 40. The first side member 44 may be disposed proximate an outer periphery of the mobile chassis 12.

The second side member 46 may be spaced apart from and may be disposed generally parallel to the second frame member 42. The second side member 46 may be disposed proximate an outer periphery of the mobile chassis 12 and may be disposed opposite the first side member 44.

Figure 2:
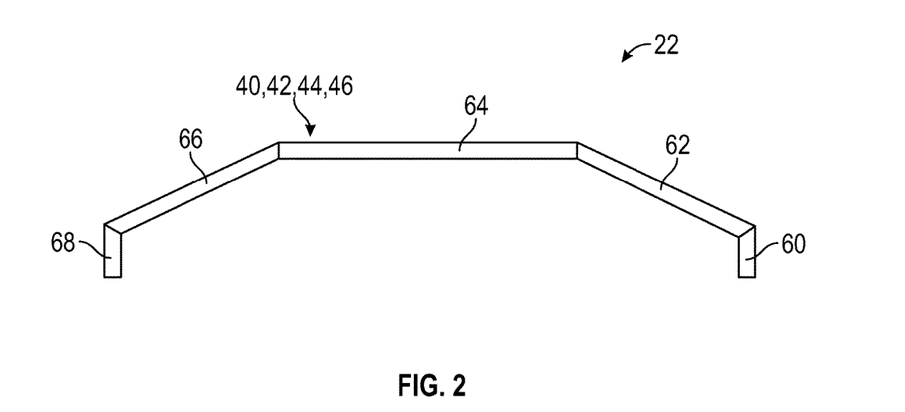
FIG. 2 is a side view of a frame assembly of the vehicle safety system target.

Referring to FIG. 2, a side view of the frame assembly 22 is shown. As shown in the side view, the first frame member 40, the second frame member 42, the first side member 44, and/or the second side member 46 may have a substantially similar configuration. The first frame member 40, the second frame member 42, the first side member 44, and/or the second side member 46 may include a first portion 60, a second portion 62, a third portion 64, a fourth portion 66, and a fifth portion 68. The first portion 60 may be disposed proximate the at least one steerable wheel 14 of the mobile chassis 12. The first portion 60 may be disposed generally perpendicular to the first platform 20. The second portion 62 may extend from the first portion 60 to the third portion 64 and may be disposed in a non-perpendicular and a nonparallel relationship with at least one of the first portion 60, the third portion 64, and the fifth portion 68. The third portion 64 may be disposed generally parallel to the first platform 20 and may be disposed generally perpendicular to the first portion 60. The fourth portion 66 may extend from the third portion 64 to the fifth portion 68. The fourth portion 66 may be disposed in a non-perpendicular and a nonparallel relationship with at least one of the first portion 60, the third portion 64, and the fifth portion 68. The fifth portion 68 may be disposed proximate the at least one drive wheel 16 of the mobile chassis 12 and may be disposed generally parallel to the first portion 60. The fifth portion 68 may be disposed generally perpendicular to the first platform 20.

Referring to FIGS. 1 and 3, the first cross member 48 may extend between and may be connected to the first frame member 40, the second frame member 42, the first side member 44, and the second side member 46. The first cross member 48 is spaced apart from the first platform 20.

The first cross member 48 and the first side member 44 at least partially define a first corner 70 of the frame assembly 22. The first cross member 48 and the second side member 46 at least partially define a second corner 72 of the frame assembly 22.

The second cross member 50 may be spaced apart from the first cross member 48. The second cross member 50 may be spaced apart from the first platform 20. The second cross member 50 may extend between and may be connected to the first frame member 40, the second frame member 42, the first side member 44, and the second side member 46 in the embodiments shown. The second cross member 50 operatively connects the fifth portion 68 of the first side member 44 and the second side member 46.

The third cross member 52 may extend between and may be connected to the first frame member 40, the second frame member 42, the first side member 44, and the second side member 46. The third cross member 52 may be disposed proximate and may be disposed generally parallel to the first end 34 of the first platform 20 and in the embodiment shown the third cross member 52 may be operatively connected to the first platform 20 proximate the first end 34.

The fourth cross member 54 may extend between and may be connected to the first frame member 40 the second frame member 42, the first side member 44, and the second side member 46. The fourth cross member 54 may be disposed proximate and is disposed generally parallel to the second end 36 of the first platform 20 and in the embodiment shown the fourth cross member 54 may be operatively connected to the first platform 20 proximate the second end 36.

In at least one embodiment, a connecting member 80 is provided. The connecting member 80 extends between and operatively connects the mobile chassis 12 and the frame assembly 22. The connecting member 80 connects the first side member 44 to the mobile chassis 12 proximate a portion of the mobile chassis 12 that is disposed between the at least one steerable wheel 14 in the at least one drive wheel 16.

Figure 6:
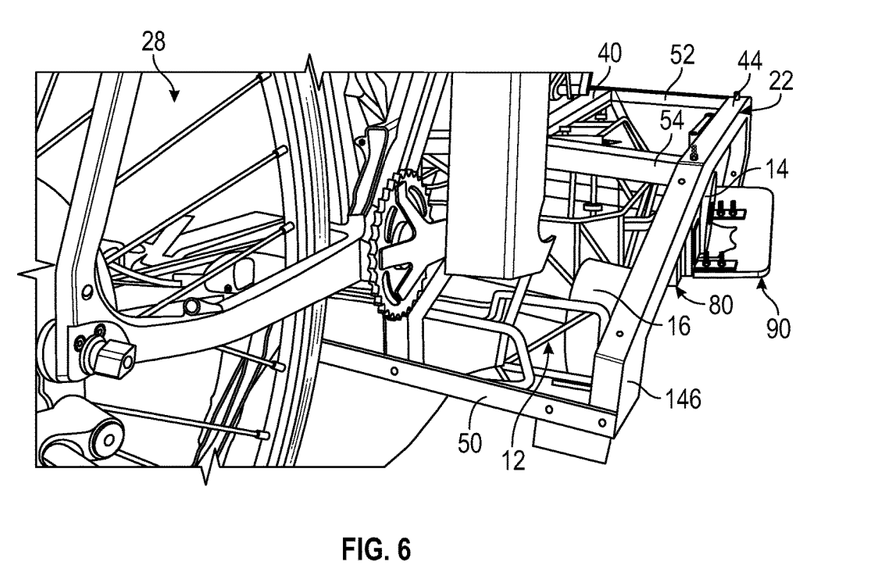
FIG. 6 is a partial perspective view of the vehicle safety system target.
Figure 7:
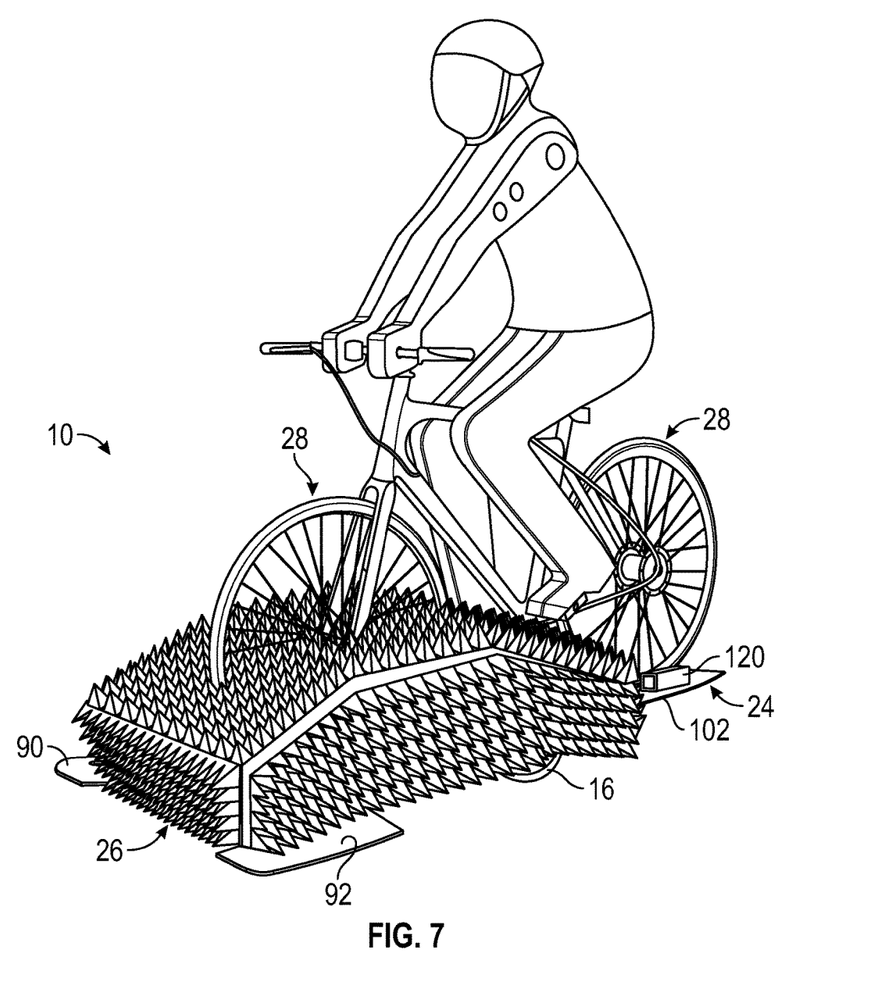
FIG. 7 is a view of the vehicle safety system target having a panel assembly disposed on the frame assembly.

Referring to FIGS. 1, 6, and 7, a first curb guide 90 and a second curb guide 92 may be provided and may be operatively connected to at least one of the mobile chassis 12 and the frame assembly 22. The first curb guide 90 and the second curb guide 92 are capable of enabling the vehicle safety system target 10 to accurately follow curbs and other road structures semi-automatically by their engagement with the curb or other road structures.

The first curb guide 90 may be disposed proximate the first corner 70. The first curb guide 90 may be at least partially disposed about the at least one steerable wheel 14. In at least one embodiment, the first curb guide 90 is operatively connected to the first corner 70 and the connecting member 80. In at least one embodiment, the first curb guide 90 may be operatively connected to the first corner 70 and the mobile chassis 12.

The second curb guide 92 may be disposed proximate the second corner 72. The second curb guide 92 may be at least partially disposed about another steerable wheel. In at least one embodiment, the second curb guide 92 may be operatively connected to the second corner 72 and the mobile chassis 12.

The first curb guide 90 and/or the second curb guide 92 enables the vehicle safety system target 10 to ride against a curb and prevents the at least one steerable wheel 14 from engaging the curb. The first curb guide 90 and/or the second curb guide 92 may maintain or improve the stability of the vehicle safety system target 10.

Referring to FIGS. 1, 7, and 8-10, the second platform 24 may be spaced apart from the first platform 20. The second platform 24 may be disposed substantially parallel to but not coplanar with the first platform 20. The second platform 24 may be configured as a skid plate. The second platform 24 may be made of a plastic or polymer material or may be coated with a plastic or polymer to reduce sliding friction between the second platform 24 and a surface.

Figure 8:
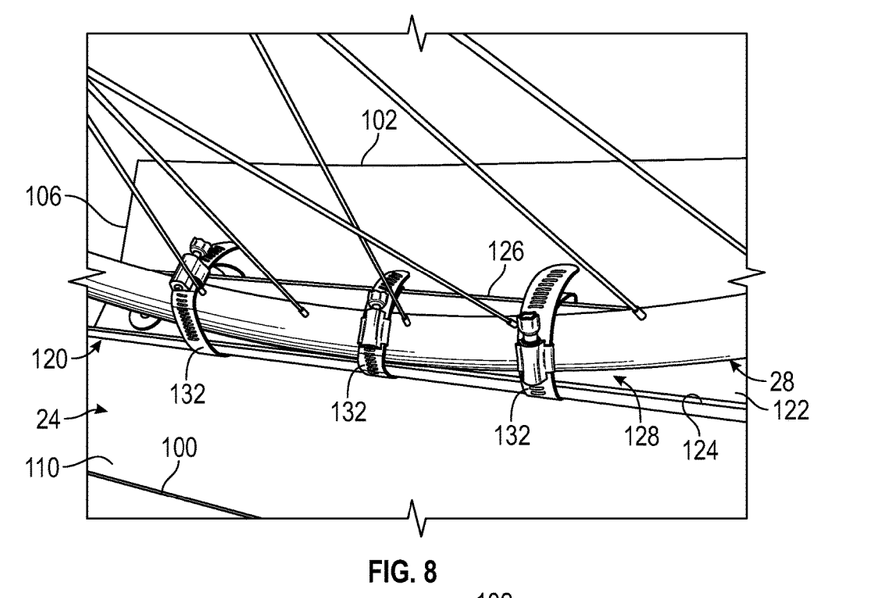
FIG. 8 is a partial view of a second platform of the vehicle safety system target.
Figure 9:
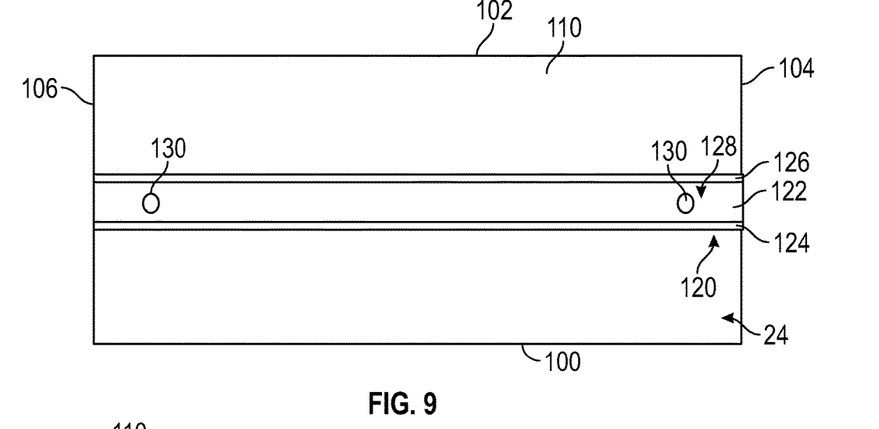
FIG. 9 is a plan view of the second platform of the vehicle safety system target.
Figure 10:
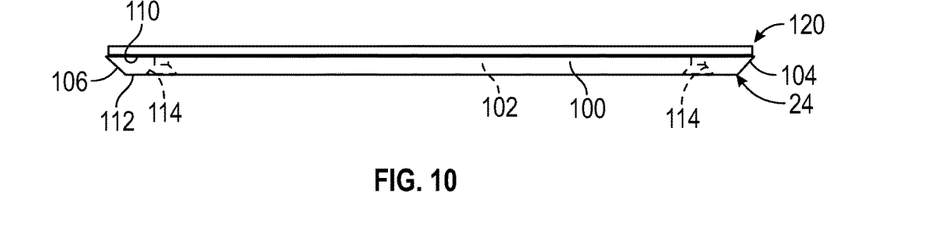
FIG. 10 is a side view of the second platform of the vehicle safety system target.

The second platform 24 may include a first side 100, a second side 102, a first end 104, and a second end 106. The first side 100 may be disposed substantially parallel to the second side 102. The second side 102 may be disposed opposite the first side 100. The first end 104 extends between the first side 100 and the second side 102. The first end 104 may be disposed proximate but may be spaced apart from the second cross member 50. The second end 106 may be disposed opposite the first end 104 and extends between the first side 100 and the second side 102. The first side 100, the second side 102, the first end 104, and/or the second end 106 may be chamfered such that a width of a top surface 110 is greater than a width of a bottom surface 112 that is in contact with a surface.

The second platform 24 may define a mounting hole 114. The mounting hole 114 may extend completely through the second platform 24. The mounting hole 114 may be a countersunk hole having a width disposed proximate the bottom surface 112 that is greater than a width disposed proximate the top surface 110.

A mounting member 120 is fixedly disposed on the second platform 24 and is configured to receive a portion of the object 28 such that the object 28 is maneuverable with the vehicle safety system target 10. A portion of the object 28 may be a rear bicycle wheel. The mounting member 120 in conjunction with the second platform 24 enables the rear bicycle wheel to slide along a surface as the vehicle safety system target 10 and the mobile chassis 12 are maneuvered.

The mounting member 120 may include a first wall 122, a second wall 124, and a third wall 126. The first wall 122 may be disposed on and may be disposed substantially parallel to the second platform 24. The second wall 124 may extend from the first wall 122 and may be disposed substantially perpendicular to the first wall 122 and the second platform 24. The third wall 126 may be spaced apart from the second wall 124. The third wall 126 may extend from the first wall 122 and may be disposed substantially perpendicular to the first wall 122 and the second platform 24. The first wall 122, the second wall 124, and the third wall 126 at least partially defines a channel 128 that at least partially receives a portion of the object 28, such as a rear bicycle wheel.

The first wall 122 may define a second mounting hole 130. The second mounting hole 130 may be proximately aligned with the mounting hole 114 to receive a fastener to couple the mounting member 120 to the second platform 24.

A second securing member 132 may be configured to operatively secure, couple, or connect the object 28 to the mounting member 120 and ultimately the second platform 24. The second securing member 132 may extend about a portion of the object 28 that is received within the channel 128 of the mounting member 120. The second securing member 132 may extend about a portion of the object 28 that is received within the channel 128 of the mounting member 120 and may be at least partially disposed between the second platform 24 and the mounting member 120.

Referring to FIG. 7, the panel assembly 26 may be disposed on the first platform 20 and at least partially about the frame assembly 22. The panel assembly 26 may include a plurality of panels that are constructed of an electromagnetic radiation absorbent material. The electromagnetic radiation absorbent material may be a radiation absorbent material that avoids or minimizes the risk of detection of the mobile chassis 12 by the vehicle safety system during testing and evaluation. In at least one embodiment, the foam panels may be replaced with another electromagnetic radiation absorbing material or medium, such as an electromagnetic radiation absorbing paint, an electromagnetic radiation substance, or the like.

A panel of the plurality of panels that is disposed on the first platform 20 may be provided with a cutout to facilitate connecting the object 28 to the first platform 20.

Referring to FIGS. 1, 5, and 6, a first side panel 146 is operatively connected to the first side member 44 and a second side panel 148 is operatively connected to the second side member 46. The first side panel 146 and the second side panel 148 are configured to receive or operatively connect the panel assembly 26 to the frame assembly 22. The first side panel 146 and the second side panel 148 are provided with attachment features such as Velcro, an adhesive, or the like to removably connect the panel assembly 26 to the first side panel 146 and the second side panel 148. The first side panel 146, the second side panel 148, and the panel assembly 26 are selectively removable to allow access to components of the mobile chassis 12.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A remotely controlled vehicle safety system target, comprising:
   a first platform disposed on a remotely controlled mobile chassis including a propulsion system having at least one drivable wheel, and at least one remotely controlled steerable wheel;
   a frame assembly at least partially disposed about the mobile chassis, the frame assembly comprising:
      a first frame member disposed on the first platform, and
      a second frame member spaced apart from the first frame member and disposed on the first platform;
   a first securing member configured to couple an object to the first platform;
   a second platform that is spaced apart from the first platform;
   a mounting member disposed on the second platform; and
   a second securing member configured to couple the object to the mounting member and the second platform.

2. The vehicle safety system target of claim 1, wherein the object resembles a human riding a bicycle.

3. The vehicle safety system target of claim 2, wherein the frame assembly further comprising:
   a first side member spaced apart from and disposed generally parallel to the first frame member; and
   a second side member spaced apart from and disposed generally parallel to the second frame member.

4. The vehicle safety system target of claim 3, wherein the frame assembly further comprising:
   a first cross member extending between the first side member and the second side member, the first cross member spaced apart from and disposed generally parallel to a first end of the first platform.

5. The vehicle safety system target of claim 4, wherein the first cross member and the first side member at least partially define a first corner.

6. The vehicle safety system target of claim 5, further comprising
   a first curb guide operatively connected to the first corner.

7. A remotely controlled vehicle safety system target, comprising:
   a remotely controlled mobile chassis configured to maneuver as a human riding a bicycle, the remotely controlled mobile chassis including a propulsion system having at least one drivable wheel, and at least one remotely controlled steerable wheel;
   a first platform disposed on the mobile chassis and having a first side and a second side each extending between a first end and a second end;
   a frame assembly, comprising:
      a first frame member disposed on the first platform and extending along the first side,
      a second frame member disposed on the first platform and extending along the second side,
      a first side member spaced apart from and disposed generally parallel to the first frame member, and
      a second side member spaced apart from and disposed generally parallel to the second frame member.

8. The vehicle safety system target of claim 7, wherein the frame assembly further comprising
   a first cross member spaced apart from and disposed generally parallel to the first end, the first cross member extending between the first side member, the first frame member, the second frame member, and the second side member; and
   a second cross member spaced apart from and disposed generally parallel to the second end, the second cross member extending between the first side member, the first frame member, the second frame member, and the second side member.

9. The vehicle safety system target of claim 8, further comprising
   a panel assembly disposed on the first platform and disposed about the frame assembly.

10. The vehicle safety system target of claim 9, further comprising
   a first curb guide operatively connected to the first cross member and the first side member.

11. The vehicle safety system target of claim 10, further comprising
   a second curb guide operatively connected to the first cross member and the second side member.

12. The vehicle safety system target of claim 11, further comprising
   a first side panel operatively connected to the first side member and extending between the first cross member and the second cross member.

13. The vehicle safety system target of claim 12, wherein the first side panel operatively connects the panel assembly to the frame assembly.

14. The vehicle safety system target of claim 12, wherein the first side panel is spaced apart from first curb guide.

15. The vehicle safety system target of claim 12, further comprising
   a second side panel operatively connected to the second side member and extending between the first cross member and the second cross member.

16. The vehicle safety system target of claim 15, wherein the second side panel operatively connects the panel assembly to the frame assembly.

17. The vehicle safety system target of claim 7, further comprising a second platform spaced apart from the first platform; and
   a mounting member disposed on the second platform.

18. The vehicle safety system target of claim 17, wherein the second platform is disposed substantially parallel to the first platform.

* * * * *